US009990026B1

(12) United States Patent
Kahn et al.

(10) Patent No.: US 9,990,026 B1
(45) Date of Patent: *Jun. 5, 2018

(54) SYSTEM INCLUDING A SLEEP DETECTION MECHANISM

(71) Applicant: DP Technologies, Inc., Scotts Valley, CA (US)

(72) Inventors: Philippe Richard Kahn, Santa Cruz, CA (US); Arthur Kinsolving, Santa Cruz, CA (US); Sonia Lee Kahn, Santa Cruz, CA (US)

(73) Assignee: DP Technologies, Inc., Scotts Valley, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/213,361

(22) Filed: Jul. 18, 2016

Related U.S. Application Data

(63) Continuation of application No. 13/918,856, filed on Jun. 14, 2013, now Pat. No. 9,395,792.

(51) Int. Cl.
*G06F 1/26* (2006.01)
*G06F 1/32* (2006.01)
*H04W 4/00* (2018.01)

(52) U.S. Cl.
CPC .......... *G06F 1/3296* (2013.01); *G06F 1/3231* (2013.01); *H04W 4/008* (2013.01)

(58) Field of Classification Search
CPC .......... G06F 21/35; G06F 21/43; G06F 3/011; H04L 2209/80; H04L 43/0811

USPC .......... 713/300, 320, 323, 324, 330
See application file for complete search history.

(56) References Cited

U.S. PATENT DOCUMENTS

| | | | |
|---|---|---|---|
| 5,335,657 A | 8/1994 | Terry, Jr. et al. | |
| 5,928,133 A | 7/1999 | Halyak | |
| 6,888,779 B2 | 5/2005 | Mollicone et al. | |
| 6,928,031 B1 | 8/2005 | Kanevsky et al. | |
| 7,914,468 B2 | 3/2011 | Shalon et al. | |
| 8,179,270 B2 | 5/2012 | Rai et al. | |
| 8,398,546 B2 | 3/2013 | Pacione et al. | |
| 9,395,792 B1 * | 7/2016 | Kahn | G06F 1/3231 |
| 2002/0080035 A1 | 6/2002 | Youdenko | |
| 2004/0049132 A1 | 3/2004 | Barron et al. | |
| 2005/0143617 A1 | 6/2005 | Auphan | |
| 2005/0154330 A1 | 7/2005 | Loree | |
| 2005/0190065 A1 | 9/2005 | Ronnholm | |
| 2006/0064037 A1 | 3/2006 | Shalon et al. | |
| 2006/0293602 A1 | 12/2006 | Clark | |
| 2006/0293608 A1 | 12/2006 | Rothman et al. | |
| 2007/0287930 A1 | 12/2007 | Sutton | |
| 2008/0191885 A1 | 8/2008 | Iv et al. | |
| 2008/0234785 A1 | 9/2008 | Nakayama et al. | |
| 2009/0048540 A1 | 2/2009 | Otto et al. | |
| 2009/0082699 A1 | 3/2009 | Bang et al. | |
| 2009/0105785 A1 | 4/2009 | Wei et al. | |
| 2009/0143636 A1 | 6/2009 | Mullen et al. | |

(Continued)

*Primary Examiner* — Michael J Brown
(74) *Attorney, Agent, or Firm* — HIPLegal LLP; Judith Szepesi

(57) ABSTRACT

A method and apparatus of using sleep monitoring is described. The method comprises monitoring the user's state using a plurality of sensors in a sensor system and detecting when the user is falling asleep. The method further comprises adjusting settings in an associated device in response to the user falling asleep.

20 Claims, 8 Drawing Sheets

(56) References Cited

U.S. PATENT DOCUMENTS

| | | |
|---|---|---|
| 2009/0273478 A1* | 11/2009 | Mei .................... A61B 5/16 |
| | | 340/575 |
| 2010/0010330 A1 | 1/2010 | Rankers et al. |
| 2010/0079294 A1 | 4/2010 | Rai et al. |
| 2010/0100004 A1 | 4/2010 | van |
| 2011/0015495 A1 | 1/2011 | Dothie et al. |
| 2011/0018720 A1 | 1/2011 | Rai et al. |
| 2011/0230790 A1 | 9/2011 | Kozlov |
| 2011/0295083 A1 | 12/2011 | Doelling et al. |
| 2012/0253220 A1 | 10/2012 | Rai et al. |
| 2014/0125575 A1* | 5/2014 | Samanta Singhar ... G06F 3/005 |
| | | 345/156 |

* cited by examiner

SYSTEM INCLUDING A SLEEP DETECTION MECHANISM

RELATED

The present application claims priority to U.S. patent application Ser. No. 13/918,856, filed on Jun. 14, 2013, issuing on Jul. 19, 2016 as U.S. Pat. No. 9,395,792, and incorporates that application by reference in its entirety.

FIELD

The present invention relates to devices, and more particularly to a device including a sleep detection mechanism.

BACKGROUND

Mobile devices range from smart phones, to electronic books such as the KINDLE® by AMAZON® and the NOOK® by BARNES AND NOBLE®, and others, to tablet computers. Some of these devices now have sensors, such as touch screens and accelerometers. Accelerometers are useful, for example, to detect when the device is dropped.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

A device capable of monitoring sleep data is described. The device, in one embodiment interacts with a sensor system, which may be incorporated into the device. In embodiment, the sensor system may be implemented in a wrist-worn or other body-worn device. The sensor system may interact with a display system. In one embodiment, the mobile device including the sensor system is an eReader device, such as the KINDLE® by AMAZON® or the NOOK® by BARNES AND NOBLE®. In one embodiment, the sensor system is the wrist-worn device such as a wristband, and an associated display system is the eReader device, or a smart phone device, tablet device, or another type of computing device.

The sensor system monitors the user's state. When it detects the user falling asleep, in one embodiment, it turns off the network connection between the mobile device and other devices. In one embodiment, this may include turning off a Bluetooth Low Energy (BLE) connection between the wristband sensor system and the display device and/or the wireless network connection between the mobile device and a server. In one embodiment it turns off the screen of the display device if appropriate. In one embodiment, the system also adjusts the user environment to enhance sleep quality. In one embodiment, it also stores data about when the user fell asleep. In one embodiment, the sensor system detects that the user is waking up, the systems are turned back on. Thus, when the user wakes up and checks on his or her sleep data, the data is available for display, even though the wireless signals are cut off while the user is sleeping. This saves power, by turning off those elements that are not needed while the user is sleeping. This may also be appreciated by those that do not want a continuous wireless signal while they are sleeping due to health concerns, but do want to have up-to-date information on their display device whenever they check their data.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
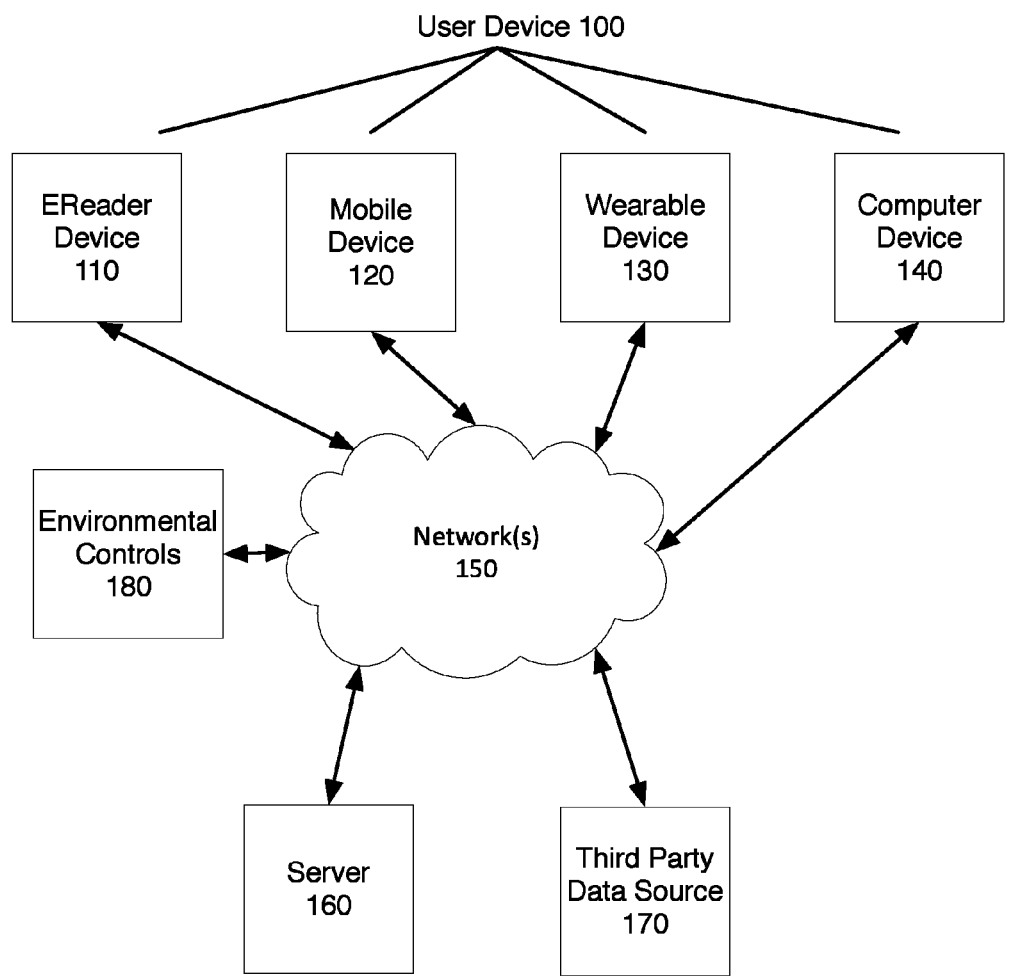
FIG. 1 is a system diagram of one embodiment of the elements of the system.

FIG. 1 is a system diagram of one embodiment of the elements of the system. The system includes one or more user devices 100, which may include an eReader device 110, a user mobile device 120, and a user wearable device 130, and a user computing device 140. In one embodiment, the sensors, which may include accelerometer sensors and other sensors, may be located in the eReader device 110, user mobile device 120, or user wearable device 130. If the sensors are located on a user wearable device 130, in one embodiment the user wearable device 130 is associated with a display device. The display device may be the eReader device 110, user mobile device 120, or computer device 140. In one embodiment, the display device may also be a server 160 which provides data to the user via a website or similar mechanism.

In one embodiment, the eReader device 110 may be customized tablet computer such as the KINDLE® by AMAZON® or the NOOK® by BARNES AND NOBLE®. In one embodiment, the eReader device 110 may be another type of mobile device, which enables a user to consume media.

The user mobile device 120 may be a user smart phone, tablet computer, or other mobile device. In one embodiment, the user mobile device 120 may include sensors that may be used for monitoring the user's status, including sleep.

The user wearable device 130 may be a user wristband device, such as the UP® by JAWBONE®, FUELBAND® by NIKE®, or a clip-on device such as the FITBIT®, or another type of device that may be worn by the user during sleep, including sensors. Optionally, the wearable device 130 may include a display.

In one embodiment, the user device 100 may communicate with server 160. In one embodiment, the user device 100 may also obtain data from server 160 and/or third party data source 170. Third party data sources 170 may include web sites, servers, and other data sources. For example, weather data may be obtained from third party data source 170.

The system utilizes sensor data to detect a user's state, and based on that state perform various adjustments. For example, the system may adjust the user interface features of the eReader device 110 or mobile device 120. In one embodiment, the system may also turn off the network, when the user is sleeping, so that data is not synchronized. In one embodiment, the system may also communicate with environmental controls 180 to alter external environment. For example, environmental controls 180 may alter the room temperature, room lighting, ambient sounds, or other factors. In one embodiment, any environmental feature that may be controlled via a network connection may be included in environmental controls 180.

Figure 2:
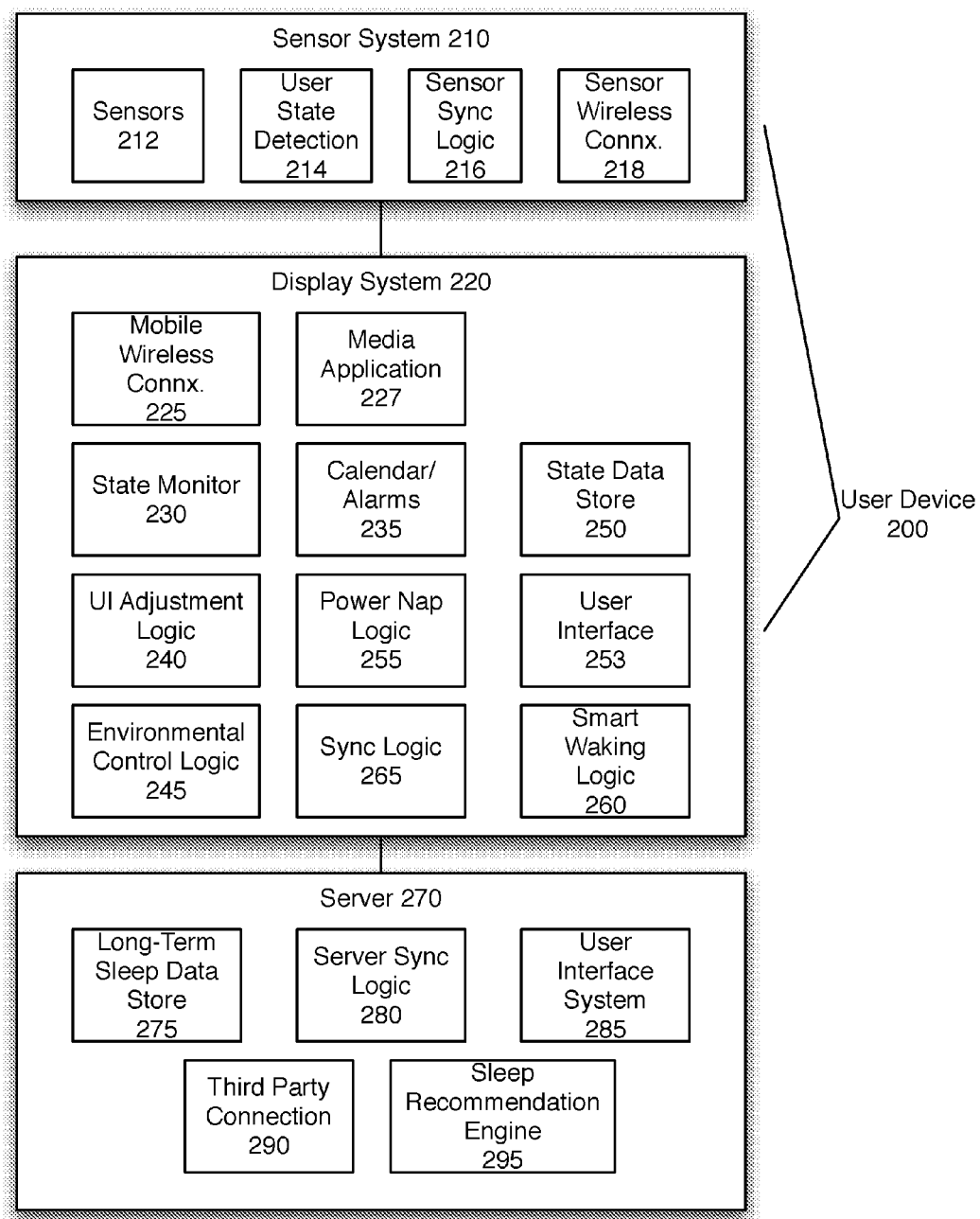
FIG. 2 is a block diagram of one embodiment of the mobile device and server system.

FIG. 2 is a block diagram of one embodiment of the mobile device and server system. The user device 200 includes a sensor system 210 and a display system 220. In one embodiment, the user device 200 may be implemented in a single device, such as a smart phone or eReader. In another embodiment, the user device 200 may include two devices, a first device including the sensor system 210 and a second display system 220, which is linked to the sensor system 210 via a wireless connection.

In one embodiment, if the sensor system 210 is a separate device such as a wristband or similar body-worn device, the sensor system 210 monitors the user's data continuously.

In one embodiment, if the sensor system 210 is integrated with the display system 220, such as a smart phone or eReader including sensors, the sensors 212 may operate to detect movement when the device is being held by the user whether in the hand, a pocket, or bag. In one embodiment, the user system 200 also works if it is placed next to the user on a bed or sofa or other soft surface, or in proximity with the user in such a way that the movements of the user can be picked up by the user system 200. In one embodiment, when the user device 200 has not moved for an extended period, some or all of the sensor system may be powered down, or put into a low power state, until movement is detected.

In one embodiment, both a body-worn device and a display device may include sensors. In one embodiment, in such a system there are two sensor systems 210, and the data from both sensor systems 210 may be utilized in combination, to determine user state.

In one embodiment, the sensor system 210 includes a plurality of sensors 212. The plurality of sensors 212 may include one or more of the following sensors: an accelerometer, a gyroscope, a temperature sensor (alternatively a pair of temperature sensors to measure a user's body temperature and ambient temperature), a magnetometer, a barometer, an altimeter, a heart rate sensor, a brain wave sensor, and other sensors. The sensors 212 are used, in one embodiment, to determine the user's state.

User state detection 214 detects the user's state. In one embodiment, the user state detection 214 may identify the user's sleep state. In one embodiment, the sleep states may be identified as disclosed in co-pending patent application U.S. Ser. No. 12/819,195, which is incorporated herein in its entirety. In one embodiment, the sensor system 210 may make this determination. In another embodiment, the sensor system 210 may send sensor data to display system 220, which may make the determination, using State monitor 230.

Sensor system 210, if it is a separate device, includes a sensor sync logic 216, to synchronize data with display system 220 and/or server 270. In one embodiment, if the sensor system 210 synchronizes the data with the display system using sensor wireless connection 218. The sensor wireless connection 218 may be a Bluetooth connection, such as Bluetooth Low Energy (BLE). In one embodiment, another Personal Area Network (PAN) may be used. Other relatively low power connections may be utilized.

Sensor sync logic 216 controls sensor wireless connection 218, and may turn off sensor wireless connection 218, when it is not needed. In one embodiment, when the user state detection 214 detects that the user is asleep, the sensor wireless connection is turned off 218. This saves power, and may be preferred by users as it reduces the amount of radiation. In one embodiment, this may be an option set by the user.

The sensor wireless connection 218 sends data to the mobile wireless connection 225. The display system 220 includes a plurality of features.

State monitor 230 either processes sensor data from sensors 212 or receives the processed sensor data/state data from state detection 214 in sensor system 210. State monitor 230 uses the user's state to control one or more elements of display system 220 and/or remote systems. In one embodiment, the UI adjustment logic 240 may be used to adjust the outputs of the display system. These outputs may include the brightness of a display, the color tones of a display, the volume of sound, the selection of sounds/songs, the tactile feedback and other user interface features. In one embodiment, state monitor 230 may also use environmental control logic 245 to adjust external environments, such as room temperature, room lighting, white noise machines, etc. One example of such external controls is described in co-pending application Ser. No. 13/622,325, which is incorporated herein by reference in its entirety.

State data store 250 provides store of historical sensor data. In one embodiment, state data store 250 stores sleep state data. User interface 253 enables the user to view the user's state data. For example, the state data may include sleep states, when, how much, and in what state the user slept. The state data may also include activity data, when, how much, and how intensively the user exercised. The state data may also include motion data, how much and when the user moved in general (e.g. steps taken or similar movement data.) Other data derived from the sensor data obtained via sensors 212 may also be shown to the user.

In one embodiment, smart waking logic 260 determines when and how to wake the user, when the user is asleep. In one embodiment, the smart waking logic 260 takes into account factors such as the time of day, calendars and/or alarms 235, and other relevant data. For example, the system may determine that the user falling asleep midday should have a power nap, rather than a full-length sleep. In that case, in one embodiment, smart waking logic 260 would pass the control to power nap logic 255. Power nap logic 255, in one embodiment, monitors the user's sleep data using sensors 212 to ensure that the user takes a refreshing short nap. An example of the implementation of the power nap logic 255 is described in U.S. patent application Ser. No. 13/676,015, which is incorporated herein by reference in its entirety.

Sync logic 265 controls the mobile wireless connection 225 which may connect the display system 220 to sensor system 210 and/or server 270. Mobile wireless connection 225 may include a personal area network connection, a WiFi connection, a cellular network connection, and/or another type of wireless connection. The sync logic 265 may turn off one or more of the connections. In one embodiment, the system turns off the wireless connections 225 when the user is asleep. In one embodiment, the sync logic 265 may turn off the WiFi connection to the server 270 whenever the display system 220 is not in use.

Server 270, in one embodiment, is used as an additional display, including user interface system 285. In one embodiment, the server 270 also includes server sync logic 280, and third party connection 290. The server sync logic 280 enables the display system 220 and/or sensor system 210 to sync the sensor and/or state data to the server. In one embodiment, the server 270 stores the data in long-term sleep data store 275. In one embodiment, long-term sleep data store 275 enables the user to review historical data. In one embodiment, the server 270 also generates statistical data from sleep data from a large number of users. This statistical data, in one embodiment, may be used to learn about sleep and health patterns of users overall. In one embodiment, the sleep recommendation engine 295 may use this statistical data to make recommendations to users. In one embodiment, recommendation engine 295 may be customized based on the user's own data.

In one embodiment, server 270 may also obtain third party data. In one embodiment, the display system 220 may also access third party data directly using mobile wireless connection 225.

In one embodiment, sensor system 210 is a wristband coupled to the display system 220 via a BLE or similar low power local connection. Display system 220 in one embodiment is a smart phone device or eReader device, coupled to the wristband via the BLE. The display system 220 is coupled to the server 270 via a WiFi connection.

In another embodiment, the user device 200 is smartphone or eReader device including the sensor system 210 and display system 220. The user device 200 is coupled to the server via a WiFi or another connection.

Figure 3:
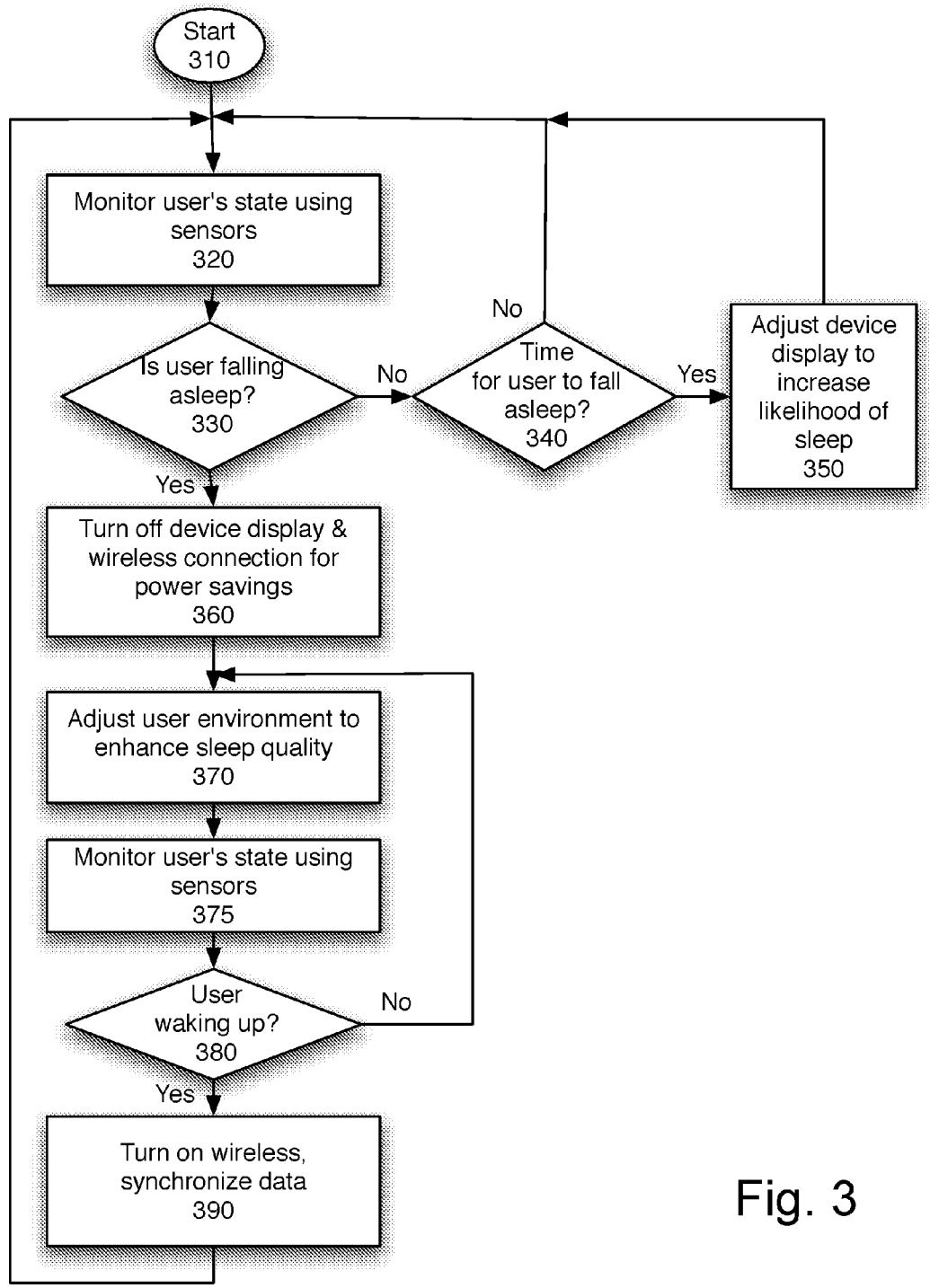
FIG. 3 is an overview flowchart of one embodiment of using the sleep detection system.

FIG. 3 is an overview flowchart of one embodiment of using the sleep detection system. The process in on embodiment starts at block 310 when the system is initiated.

At block 320, the user's state is monitored using a plurality of sensors. The user's state may include a sleep state, activity state, ergonomic state, or other user state data. In one embodiment, the system obtains sensor data, and analyzes the sensor data to obtain user state. In one embodiment, the sensors may include an accelerometer and temperature sensor. As noted above, the sensors may be integrated into a display device such as a smart phone, eReader, or other carried device. The sensors may be in a body-worn device such as a wristband, watch, clip-on sensor, or similar configuration. In one embodiment, both the body-worn device and the display device may include sensors, and the data from both sets of sensors may be utilized in determining user state.

At block 330, the process determines whether the user is falling asleep. If the user is not falling asleep, at user 340, the process determines whether it is time for the user to fall asleep. If not, the process returns to block 320, to continue monitoring the user's state. If it is time for the user to fall asleep, the process continues to block 350.

At block 350, the display device outputs are adjusted to increase the likelihood of sleep. In one embodiment, the display device outputs may include display intensity, display color tones, sounds, and other outputs. In one embodiment, a less bright screen is considered more conducive to sleep. In one embodiment, a display without blue light is considered more conducive to sleep. Of course, less loud sound, and smoother sounds is more conducive to sleep. In one embodiment, the user may also be informed that it is time for sleep. The process then returns to block 320 to continue monitoring the user's state.

If the user is falling asleep, as determined at block 330, the process continues to block 360. At block 360, the display device is turned off. The wireless connections are turned off, in one embodiment. This reduces power consumption, and radiation.

At block 370, the user environment may be adjusted to enhance sleep quality. The user environment may include room temperature, lighting, sounds, and other factors that may be controlled by the user device. At block 375, the user's sleep state is monitored using the sensors. In one embodiment, the sensors continue monitoring the user. In one embodiment, the other aspects of the user device may be turned off to save power.

At block 380, the process determines whether the user is waking up. If the user is not waking up, the process returns to block 370 to adjust the environment if needed, and continue monitoring the user's sleep state.

If the user is waking up as determined at block 380, the process continues to block 390. At block 390, the wireless connection is turned on, and the data is synchronized. By synchronizing the sensor data, if the user turns on the display device, he or she will immediately see the user state data. Thus, from the user's perspective the state data is always available, despite the wireless being turned off while the user is sleeping. The process then returns to block 320, to continue monitoring the user's state.

Figure 4:
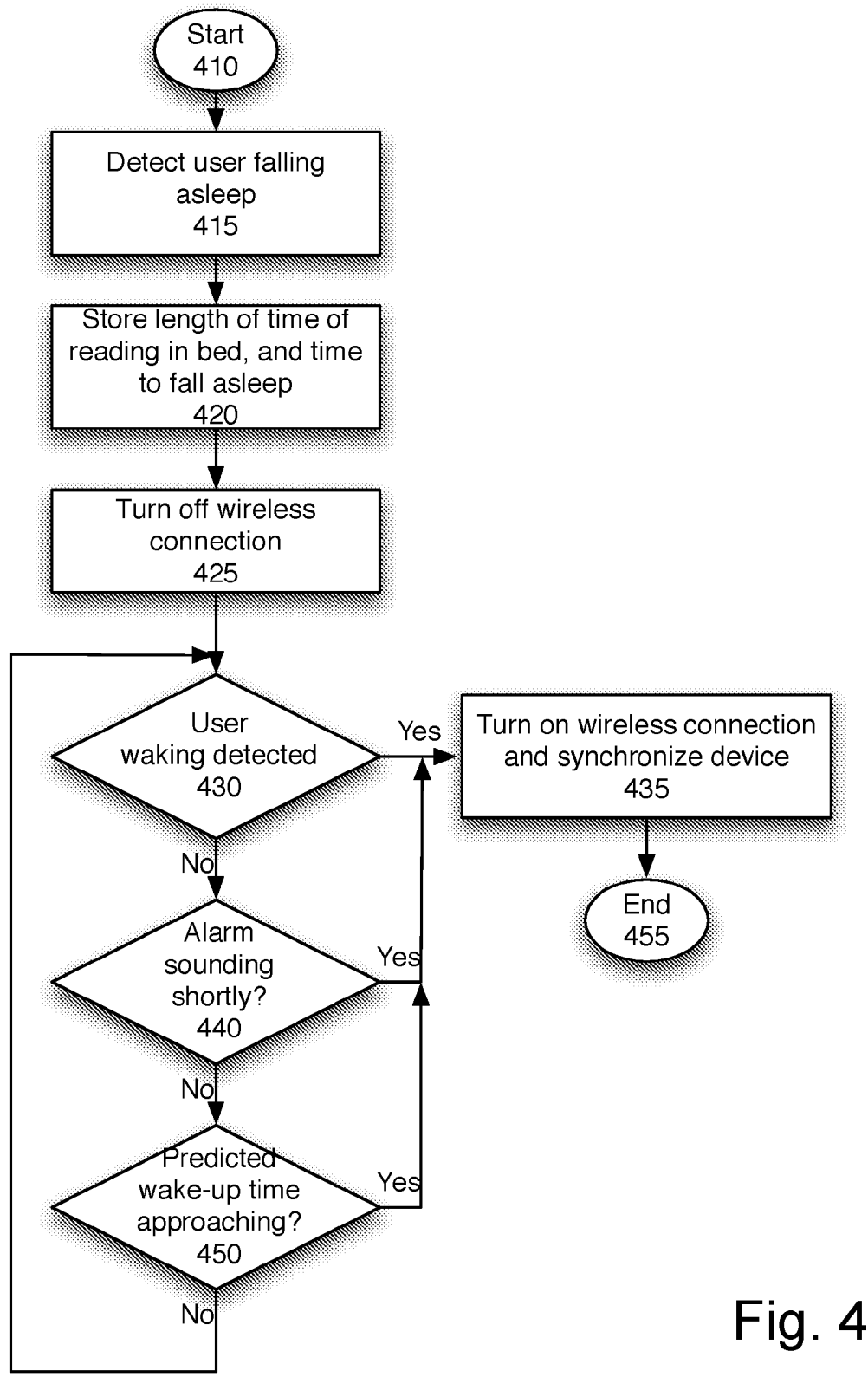
FIG. 4 is a flowchart of one embodiment of adjusting wireless connectivity.

FIG. 4 is a flowchart of one embodiment of adjusting wireless connectivity. The process starts at block 410. In one embodiment, this process discusses in more detail the turning off of connectivity for an eReader device.

At block 415, the process detects the user falling asleep.

At block 420, the length of time of reading in bed, and time to fall asleep.

At block 425, the process turns off the wireless connection.

At block 430, the process determines whether the sensors are indicating that the user is waking up. If so, the wireless connection is turned back on and the sensor is synchronized with the display device. The process then ends at block 455.

If the sensors are not indicating that the user is waking the process continues to block 440. At block 440, the process determines whether the alarm will be sounding shortly. If so, the process continues to block 435 to turn on the wireless connection and synchronize.

If the alarm will not be sounding shortly, the process continues to block 450. In one embodiment, at block 450, the process determines whether the predicted wake-up time is approaching. In one embodiment, the system can predict a wake-up time, in the absence of an alarm based on the user's historical data. For example, most users sleep approximately the same length of time each day, e.g. generally between 6 and 9 hours. So the system may be able to predict an estimated wake-up time based on a current sleep state and the estimated length of the sleep. If the prediction indicates that the user is likely to wake up shortly, the process continues to block 435 to turn on the wireless connection and synchronize the device. In this way, the system can turn off the wireless connection when the user is asleep but present synchronized data to the user immediately upon waking.

Figure 5:
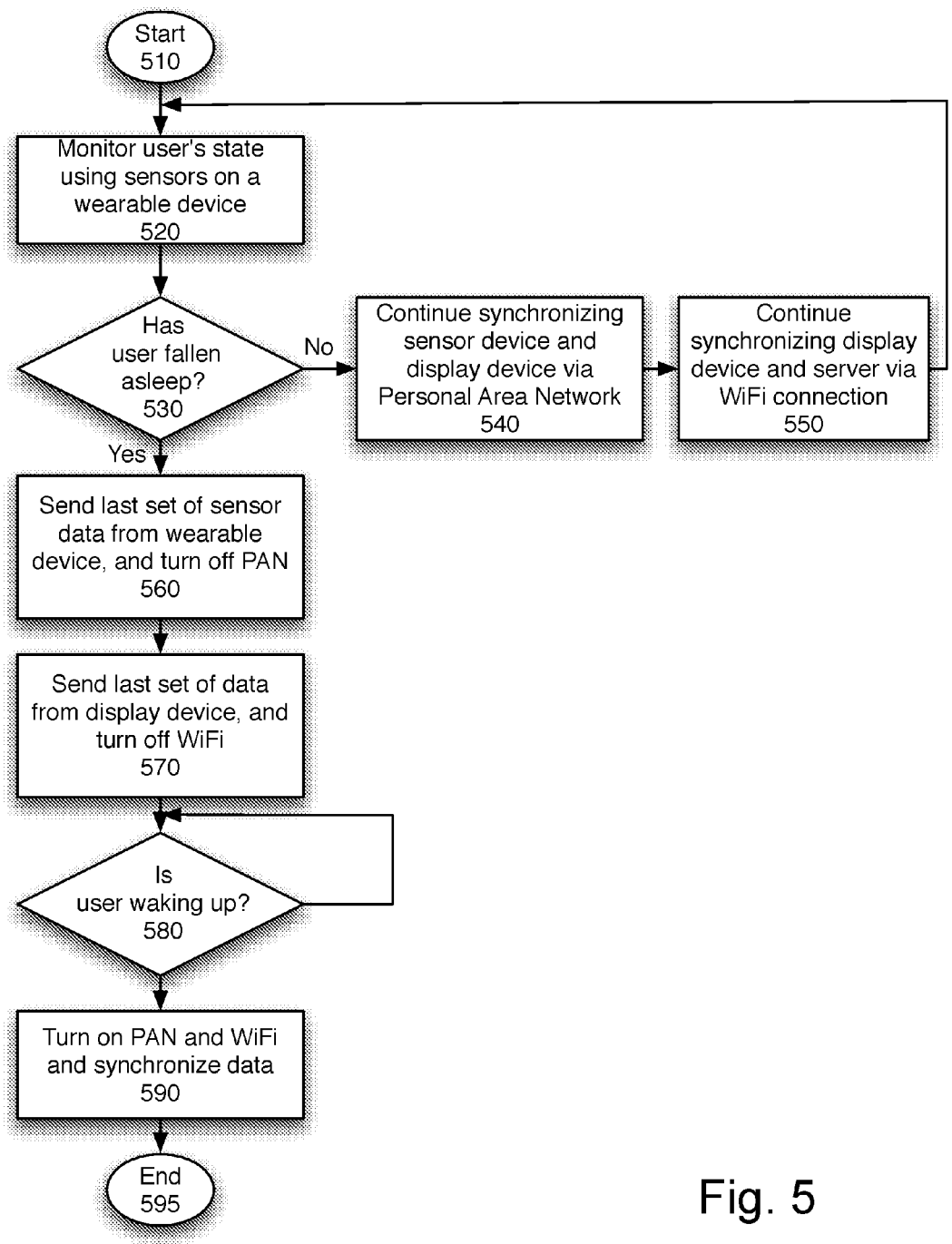
FIG. 5 is a flowchart of one embodiment of altering wireless connectivity in a multi-device system.

FIG. 5 is a flowchart of one embodiment of altering wireless connectivity in a multi-device system. In one embodiment, the user device is implemented as two devices, a sensor device implemented in a body-worn device such as a wristband, watch, glass or similar device, and display device, which receives data from the body-worn device. The process starts at block 510.

At block 520, the user's state is monitored using sensors on a wearable sensor device.

At block 530, the process determines whether the user has fallen asleep. If not, at block 540, the system continues to synchronize the sensor data from the sensor device to the display device via a personal area network. In one embodiment, the connectivity is maintained via a Bluetooth Low Power (BLE) connection. At block 550, the system continues to synchronize the display device with the server using the WiFi connection. By having the display device synchronize the data with the server, the sensor device has a better battery life. The process then returns to block 520 to continue monitoring the user's state.

If the user has fallen asleep, as determined at block 530, the process continues to block 560.

At block 560, the last set of sensor data from the sensor device is sent to the display device. In one embodiment, this includes the data on the user falling asleep. Then the PAN connection in the sensor device is turned off, in one embodiment.

At block 570, the last set of data is sent from the display device to the server, and the WiFi connection of the display device are turned off. In one embodiment, the PAN connection is also turned off. In one embodiment, the PAN connection is turned on periodically to enable the display device to receive data from the sensor device.

At block 580, the process determines whether the user is waking up. The user waking up is determined based on the sensor data from the sensor device. In one embodiment, a subset of the sensors and other elements of the sensor device are turned off to reduce power consumption. In one embodiment, a subset of the display device is also turned off.

If the user is waking up, the PAN is turned on in the sensor device, and the data is sent to the display device, at block 590. The display device turns on the WiFi, and synchronizes the data to the server. The process then ends at block 595.

Figure 6:
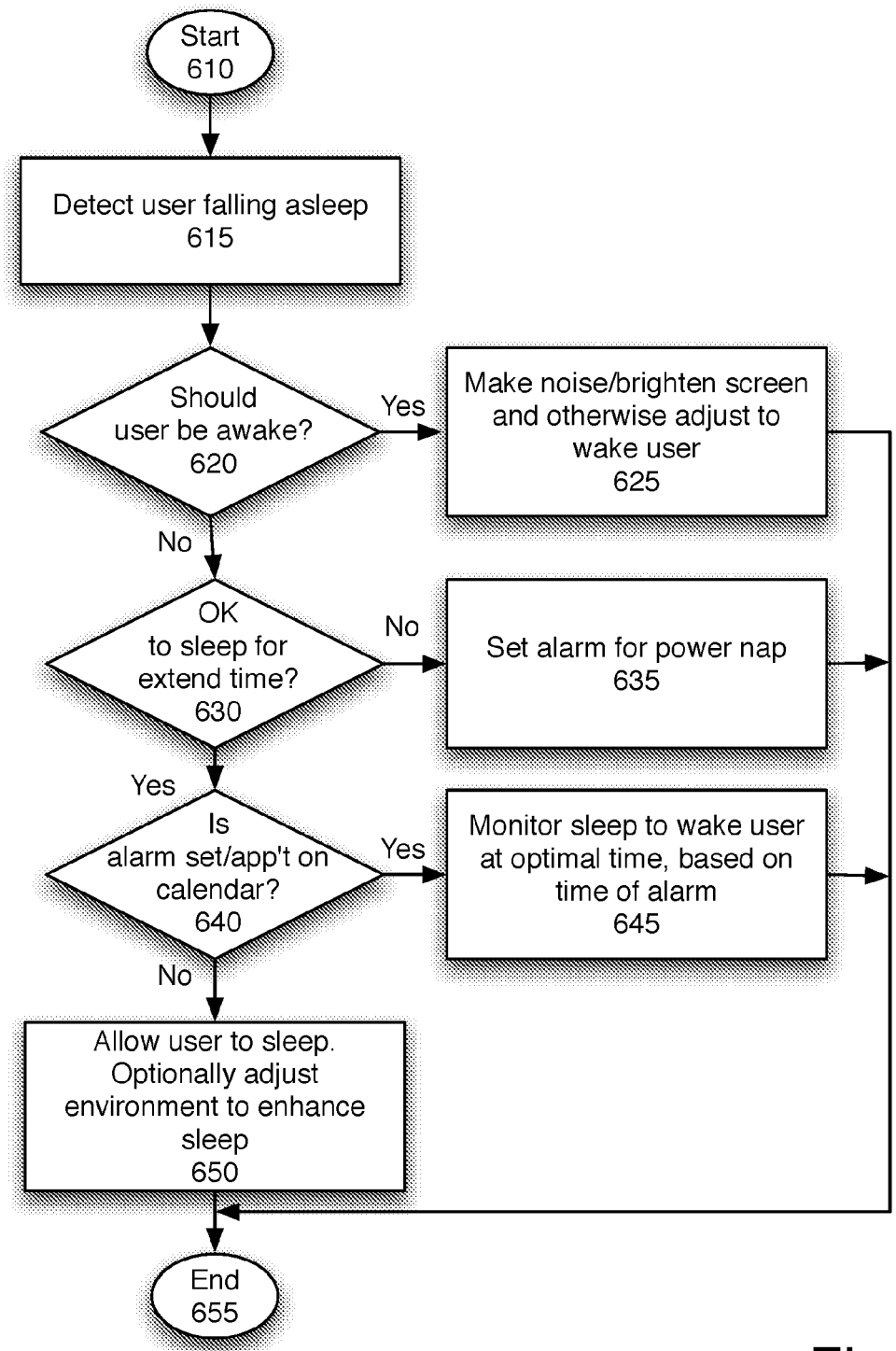
FIG. 6 is a flowchart of one embodiment of reactions to detecting the user falling asleep.

FIG. 6 is a flowchart of one embodiment of reactions to detecting the user falling asleep. The process starts at block 610.

At block 615, the process detects the user falling asleep.

At block 620, the process determines whether the user should be awake. In one embodiment, if the user is scheduled to be studying or working, or it is the middle of the day, the system may determine that the user should be awake. In one embodiment, if the user has an item on the calendar for which he or she needs to prepare, such as a test or a meeting or a project due, the system may determine that the user needs to be awake.

If the system determines that the user should be awake, when the system detects the user starting to fall asleep, at block 625 the system adjusts to wake the user. In one embodiment, this may include making a loud noise, brightening the screen, changing the sound output to something that is likely to wake the user, sounding an alarm, etc. In one embodiment, the system may also adjust environmental conditions to reduce the likelihood that the user will fall asleep. For example, in one embodiment, the room temperature is set to a cooler temperature, and the lighting levels in the room are raised. Other adjustments may also be made. The process then ends at block 655.

If, at block 620, the process determined that the user need not be awake at this time, the process continues to block 630. At block 630, the process determines whether it is OK for the user to sleep for an extended period. If it is not OK for the user to sleep for an extended period, at block 635, the system sets up a power-nap. A power nap is a short sleep period (generally ranging between 21 and 35 minutes) which is refreshing to the user. By allowing the user to power nap, the user gets the benefit of some rest, without the time investment of a full sleep. The process then ends, at block 655.

If it is OK to sleep for an extended time, as determined at block 630, the process continues to block 640. At block 640, the process determines whether an alarm is set. In one embodiment, the user may have set an alarm manually. The alarm may be one-time or a repeating alarm. If no alarm is set, in one embodiment, the system may automatically set an alarm based on appointments in the user's calendar. In one embodiment, the system may set an alarm based on a calendar item. For example, in one embodiment, an alarm may be set 30 minutes before a calendar appointment, to ensure that the user can be ready. In one embodiment, the lead time provided before the time of the calendar appointment may be adjusted based on real-time factors. For example, if the user has an appointment 30 minutes away, given current traffic conditions, the lead time may be adjusted to account for the time to wake, get dressed and prepared, and drive to the appointment.

If there is an alarm set, or automatically set by the system, at block 645 the user's sleep is monitored to wake the user at an optimal time, based on the alarm. In one embodiment, instead of sounding the alarm at a particular time, the system sounds the alarm within a range of time (e.g. 30 minutes) at an optimal point in the user's sleep cycle. The process then ends at bock 655.

If there is no alarm set or generated, at block 650, the user allowed to sleep. In one embodiment, the user's environment may be adjusted to enhance sleep. In one embodiment, this may be done with any of the sleep settings discussed above. The process then ends.

Figure 7:
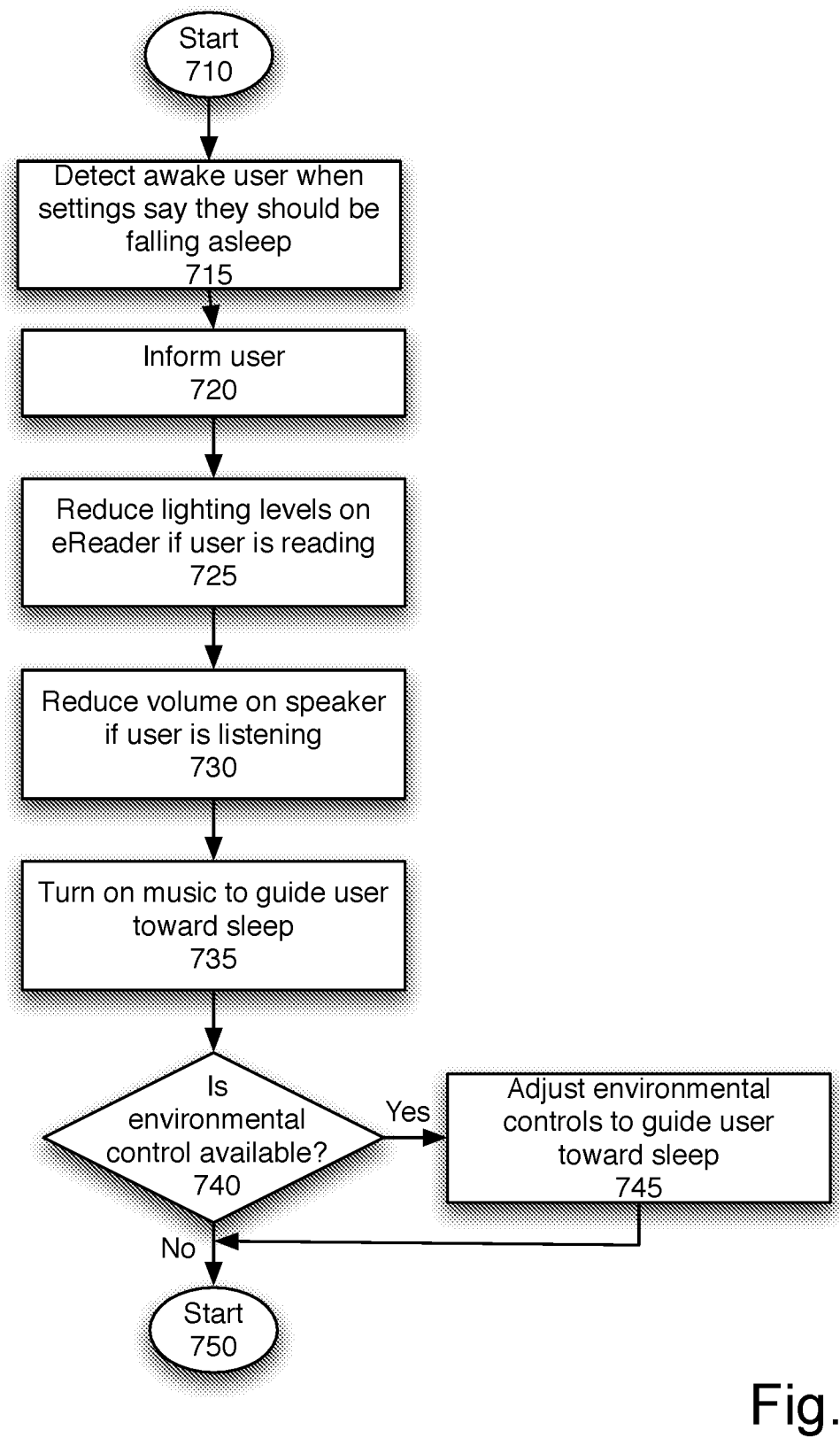
FIG. 7 is a flowchart of one embodiment of reactions to detecting the user being awake.

FIG. 7 is a flowchart of one embodiment of reactions to detecting the user being awake. The process starts at block 710. In one embodiment, these methods are used to guide a user toward sleep, when the system determines that the user is awake but should be asleep.

At block 715, the system detects an awake user when the settings say that the user should be asleep. In one embodiment, the system may indicate that the user should be asleep when it is late night. In one embodiment, the system may determine that it is time for the user to be sleeping when the user has an alarm set within a time period that indicates that the user should be asleep to get a full night of sleep.

At block 720, the process informs the user that he or she should be going to sleep.

At block 725, the system reduces the lighting levels on the eReader device, if the user is reading. In one embodiment, in addition to reducing lighting levels, the system may also reduce certain light components that are associated with wakefulness.

At block 730, the system reduces the volume on the speakers, if the user is listening to music, a podcast, or other audio data. In one embodiment, at block 735, the system may turns on sound, or optionally replaces the user's current listening choice with a more appropriate choice to prompt the user to go to sleep. In one embodiment, this is done only with the user's consent. In one embodiment, the sounds used to guide the user toward sleep may be white noise, or other sounds designed to trigger sleep.

At block 740, the process determines whether environmental controls are available. Environmental controls enable the user device, through the server or directly, to control one or more external devices or controls for the home or other location. For example, environmental controls may include control of local temperature, lighting levels, sounds, and optionally other aspects such as scents, bed softness, etc. If environmental controls are available, at block 745 the environment is adjusted to guide the user toward sleep. For example, users are more likely to fall asleep in a warm and dark room. Therefore, increasing the room temperature and decreasing the lighting level may be useful to guide the user toward sleep. The process then ends at block 750.

Figure 8:
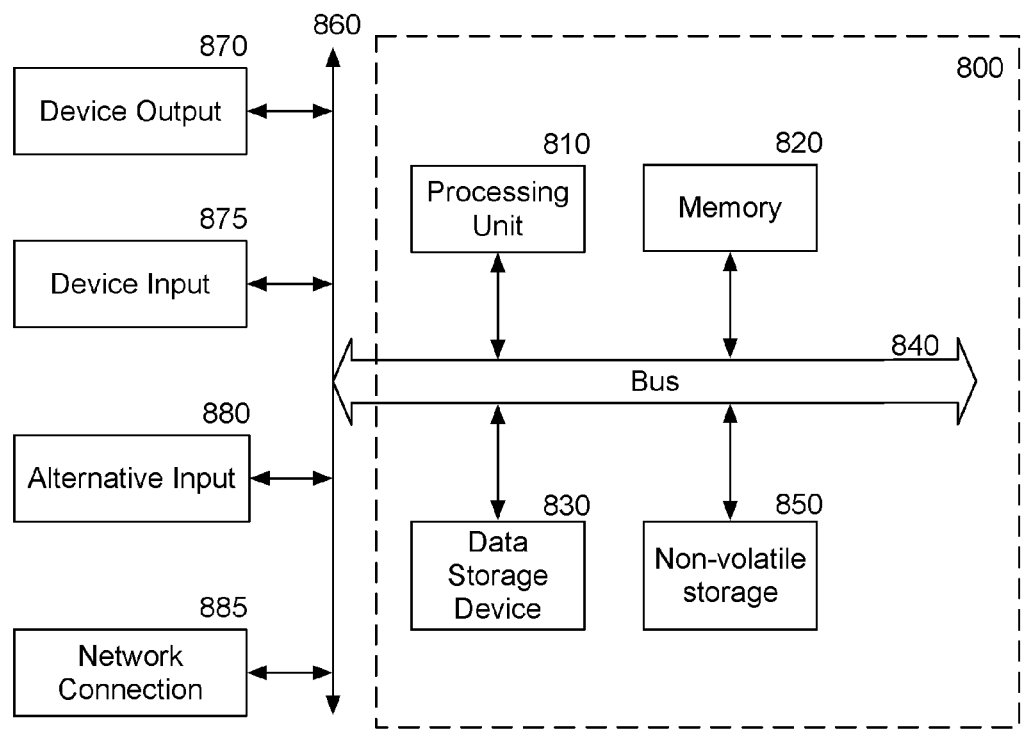
FIG. 8 is a block diagram of one embodiment of a computer system that may be used with the present invention.

FIG. 8 is a block diagram of a particular machine that may be used with the present invention. It will be apparent to those of ordinary skill in the art, however that other alternative systems of various system architectures may also be used.

The data processing system illustrated in FIG. 8 includes a bus or other internal communication means 840 for communicating information, and a processing unit 810 coupled to the bus 840 for processing information. The processing unit 810 may be a central processing unit (CPU), a digital signal processor (DSP), or another type of processing unit 810.

The system further includes, in one embodiment, a random access memory (RAM) or other volatile storage device 820 (referred to as memory), coupled to bus 840 for storing information and instructions to be executed by processor 810. Main memory 820 may also be used for storing temporary variables or other intermediate information during execution of instructions by processing unit 810.

The system also comprises in one embodiment a read only memory (ROM) 850 and/or static storage device 850 coupled to bus 840 for storing static information and instructions for processor 810. In one embodiment, the system also includes a data storage device 830 such as a magnetic disk or optical disk and its corresponding disk drive, or Flash memory or other storage which is capable of storing data when no power is supplied to the system. Data storage device 830 in one embodiment is coupled to bus 840 for storing information and instructions.

The system may further be coupled to an output device 870, such as a cathode ray tube (CRT) or a liquid crystal display (LCD) coupled to bus 840 through bus 860 for outputting information. The output device 870 may be a visual output device, an audio output device, and/or tactile output device (e.g. vibrations, etc.)

An input device 875 may be coupled to the bus 860. The input device 875 may be an alphanumeric input device, such as a keyboard including alphanumeric and other keys, for enabling a user to communicate information and command selections to processing unit 810. An additional user input device 880 may further be included. One such user input device 880 is cursor control device 880, such as a mouse, a trackball, stylus, cursor direction keys, or touch screen, may be coupled to bus 840 through bus 860 for communicating direction information and command selections to processing unit 810, and for controlling movement on display device 870.

Another device, which may optionally be coupled to computer system 800, is a network device 885 for accessing other nodes of a distributed system via a network. The communication device 885 may include any of a number of commercially available networking peripheral devices such as those used for coupling to an Ethernet, token ring, Internet, or wide area network, personal area network, wireless network or other method of accessing other devices. The communication device 885 may further be a null-modem connection, or any other mechanism that provides connectivity between the computer system 800 and the outside world.

Note that any or all of the components of this system illustrated in FIG. 8 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 820, mass storage device 830, or other storage medium locally or remotely accessible to processor 810.

It will be apparent to those of ordinary skill in the art that the system, method, and process described herein can be implemented as software stored in main memory 820 or read only memory 850 and executed by processor 810. This control logic or software may also be resident on an article of manufacture comprising a computer readable medium having computer readable program code embodied therein and being readable by the mass storage device 830 and for causing the processor 810 to operate in accordance with the methods and teachings herein.

The present invention may also be embodied in a handheld or portable device containing a subset of the computer hardware components described above. For example, the handheld device may be configured to contain only the bus 840, the processor 810, and memory 850 and/or 820. In one embodiment, the sensor system, discussed above, may include a plurality of sensors, a processor such as a DSP, a memory, and a communication system. The display device, on the other hand, in one embodiment, includes optionally one or more sensors, the processor, memory, communications mechanism, user I/O, and other elements.

The handheld device may be configured to include a set of buttons or input signaling components with which a user may select from a set of available options. These could be considered input device #1 875 or input device #2 880. The handheld device may also be configured to include an output device 870 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 810, a data storage device 830, a bus 840, and memory 820, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 885.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 810. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

One of ordinary skill in the art will recognize that the flowcharts shown are conceptual representations of the operations used. The specific operations of the processes may not be performed in the exact order shown and described. Furthermore, in some embodiments, some of the blocks shown may be skipped. Additionally, the specific operations may not be performed in one continuous series of operations, and different specific operations may be performed in different embodiments. Furthermore, the process could be implemented using several sub-processes, or as part of a larger macro process. For instance, in some embodiments, the processes may be performed by one or more software applications that execute on one or more computers. Furthermore, the processes may be split between devices, such that a portion of a process is performed on one device, while another portion is performed on another device.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of using sleep monitoring comprising:
    monitoring a user's state using a plurality of sensors in a first device including a sensor system;
    detecting when the user is falling asleep based on data from the sensor system;
    turning off a network connection in an associated device in response to the detecting when the user is falling asleep to reduce power consumption by the associated device.

2. The method of claim 1, wherein the sensor system comprises a body-worn device, and the associated device comprises one of: a smart phone, an e-reader, a tablet computer, a display device, and a computer.

3. The method of claim 2, wherein the network connection is a Bluetooth Low Energy (BLE) connection.

4. The method of claim 1, further comprising:
    turning off a connection between the associated device and a server, in response to the user falling asleep.

5. The method of claim 1, further comprising:
    determining whether the user should be falling asleep, and if so, adjusting a user environment to increase a likelihood of a user sleeping.

6. The method of claim 5, wherein adjusting the user environment comprises lowering a display intensity, changing a sound output, and alerting the user.

7. The method of claim 1, further comprising:
    determining whether the user should be awake, and if so, adjusting the user environment to decrease the likelihood of a user sleeping.

8. The method of claim 1, further comprising:
    determining that a current sleep should be a power nap, based on a plurality of factors, and setting an alarm to awaken the user after a power nap.

9. The method of claim 8, wherein the plurality of factors comprise: time of day, calendar items, and user input.

10. The method of claim 1, further comprising:
    upon detecting the user waking up, turning on the network connection and synchronizing data, such that the associated device has up-to-date information available to the user.

11. A system comprising:
    a sensor system including a plurality of sensors to monitor a status of a user interacting with a separate associated device;
    a user state detection system to determine when a user falls asleep based on data from the plurality of sensors;
    an associated system controller, to adjust a turning off a network connection in the associated device when the user falls asleep, saving a state of the associated device.

12. The system of claim 11, wherein the sensor system is incorporated into a wearable device, the wearable device coupled to the associated system via a wireless connection.

13. The system of claim 11, wherein the associated system is one of: an e-reader, a display device, a computer, and a mobile phone.

14. The system of claim 12, further comprising:
    a sensor sync logic to turn off the wireless connection when the sensor system detects that the user is asleep.

15. The system of claim 11, wherein the sensor system is incorporated into the associated device, and the sensor system functions to detect the user state when: the user is holding the associated device and when the associated device is placed on a soft surface in proximity to the user.

16. The system of claim 11, further comprising:
    a user interface adjustment logic to adjust interface features based on the sensor data, to do one or more of: assist the user in falling asleep, assist the user in falling asleep, and set an appropriate sleep period.

17. A device for sleep monitoring comprising:
    a plurality of sensors to monitor a user's state;
    a user state detection system to detect when the user is falling asleep; and
    a sensor sync logic to adjust a setting on a separate associated device via a wireless connection in response to the user falling asleep and to turn off the wireless connection.

18. The device of claim 17, wherein the plurality of sensors comprises a body-worn device, and the separate associated device comprises one of: a smart phone, an e-reader, a display system, a tablet computer, and a computer.

19. The device of claim 17, further comprising:
    the user state detection system to determine that the user is waking up; and
    the sensor sync logic, in response to the determination that the user is waking up, to turn on the wireless connection and synchronize the sensor data to the display device, such that current state data is available to the user at all times.

20. The device of claim 17, wherein the associated device comprises:
    a user interface to interact with the user, the user interface including one or more of a display and a sound output;
    a user interface adjustment logic to adjust the user interface in response to the user state data, the adjustment comprising one or more of:

adjusting a user environment to increase or decrease a likelihood of a user sleeping, wherein adjusting the user environment comprises one or more of: altering a display intensity on the display device, changing a sound output, and alerting the user.

* * * * *